United States Patent [19]
Mitzutani et al.

[11] Patent Number: 5,202,199
[45] Date of Patent: Apr. 13, 1993

[54] BATTERY MARKED WITH IRRADIATED TRACE DOTS

[75] Inventors: Seiichi Mitzutani; Kazumitsu Jibiki; Koji Arai; Masao Nakamura; Kunihide Miura, all of Osaka; Fumio Daio, Nara, all of Japan

[73] Assignee: Matsushita Electric Industrial Co., Osaka, Japan

[21] Appl. No.: 789,590

[22] Filed: Nov. 8, 1991

[51] Int. Cl.$^5$ .................. H01M 2/02; H01M 2/04
[52] U.S. Cl. .................................. 429/176; 429/1; 429/163; 429/175
[58] Field of Search ............... 429/1, 175, 90, 122, 429/176, 163

[56] References Cited

U.S. PATENT DOCUMENTS 2,999,893  9/1961  Casserly ............................... 429/1
4,562,128 12/1985  Humphreys et al. ............ 429/175 X

FOREIGN PATENT DOCUMENTS 55-110001  8/1980  Japan .
0197656  11/1983  Japan .................................. 429/175

Primary Examiner—John S. Maples

[57] ABSTRACT

This invention relates to the battery and its marking process with desired designs marked on the surface of a metal container consisting of case and cover containing battery system elements within and an external metal jacket by scanning pulse laser beams and leaving a certain arrangement of dotted irradiated traces. The above marking process is suitable for inscribing finely detailed marks on small-sized batteries extensively marketed these days. Also, this process can handle frequent changes of inscription to be marked quickly and economically without losing superior clarity. Moreover, the industrial benefit will be further increased by combining it with the existing mechanical marking process, using convex dies for stamps.

3 Claims, 5 Drawing Sheets

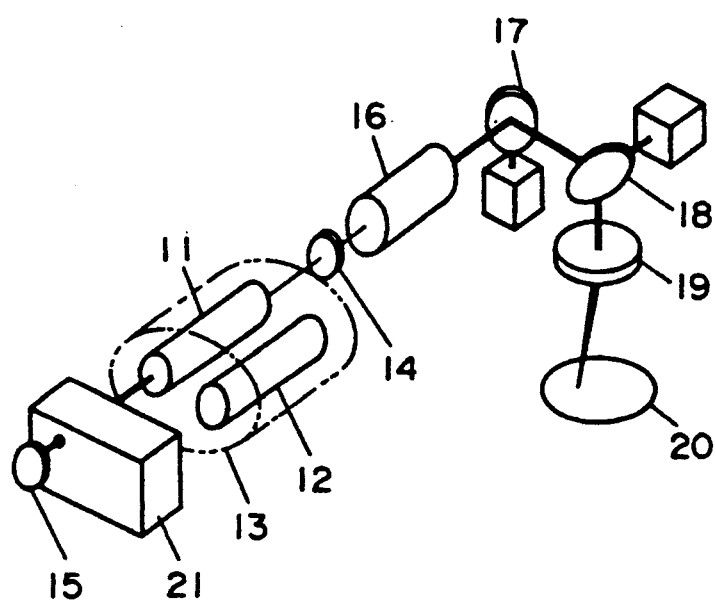
F I G. 2

FIG. 4(A) (PRIOR ART)
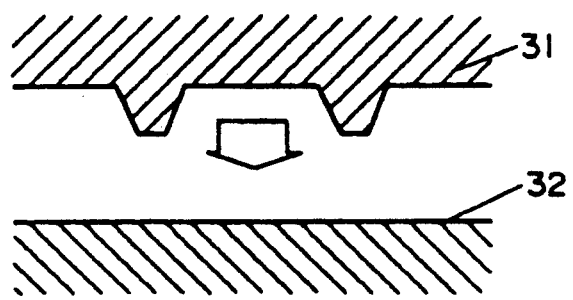
FIG. 4(B) (PRIOR ART)
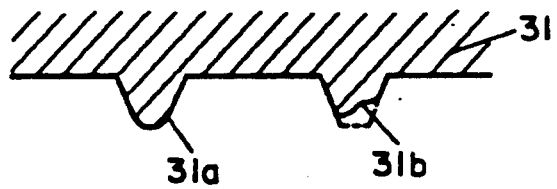
FIG. 4(C) (PRIOR ART)

BATTERY MARKED WITH IRRADIATED TRACE DOTS

BACKGROUND OF THE INVENTION

This invention relates to a battery using a metal container consisting of a metal case serving as one polar terminal and a metal cover serving as the antipolar terminal, containing battery system elements within. More particularly, the invention relates to the marking process for the battery products.

To date, such marks as trademarks, model numbers, lot numbers for manufacturing, and dates stamped on battery products made of metal containers have been stamped by a convex die 31 designed for those particular marks onto the designated surface of the battery product, referred to as marking surface 32 in FIG. 4(A), using, which caused local plastic deformation of marking surface 32 as shown in FIG. 4(B). This process, however, decreases the reliability of marking since they become unclear due to wearing 31a or chipping 31b after repeated use of the marking convex die 31. Besides, this process is not suitable for finely detailed marks. When producing battery parts such as cases and covers, numbers and characters must be changed according to client's requests as well as different manufacturing dates, and/or lot numbers, which makes process control of this process more complicated and disadvantageous.

As an other process, ink can be used for printing marks on the designated surface of battery products. However, there is a problem that a part or all of the printed mark is likely to disappear during the succeeding manufacturing and transporting processes, since the printed ink is not necessarily permanent.

In Japanese Patent Laid-Open Showa 54-110001/'80 (Patent Publication Showa 62-27521/'87), a new marking process, in which several characters are marked on the surface of electronic components at one time by an irradiating laser beam, is described. As shown in FIG. 5, laser beam 43 generated from laser rod 41 and focused by optical system 42 passes through mask 4 with pattern holes designed for particular marks. In this process, a laser beam irradiates the marking surface simultaneously, however, the energy of laser beams on the marking surface is reduced by the mask since laser beams are irradiated on the marking surface proportionately to the area of pattern holes, resulting in blurred images on the shiny surface of positive and negative terminals of a battery. If the laser power is increased to obtain clearer images, the life of a mask is greatly shortened since a high-power laser beam is also irradiated onto the mask itself. Also, in terms of productivity and cost, this process is unsuitable as a marking process of battery products, in which various types of marking are required, based on the fact that manufacturing of pattern masks requires relatively long working time and high cost.

SUMMARY OF THE INVENTION

This invention solves the above problems and provides a new battery marking process and a battery with a desired design which is marked economically with a reliability in a short time.

Namely, cell elements and metal parts are assembled into a single cell without stamping a part or all of the mark. Then the requested design is marked by scanning and irradiating a pulse laser beam on the designated position of the positive terminal surface, the negative terminal surface, sides of the cell, and/or the external metal jacket containing a battery composed of singural cell or plural cells. One shot of pulse laser beam locally melts and evaporates a part of the marking surface of the metal, leaving a dotted irradiated trace. The dimension of this concave, dotted irradiated trace can be altered within the range of 50 to 250 $\mu m$ in depth by mainly adjusting the beam diameter, aperture in the optical system, and distance between the focal point and the marking surface. Therefore, requested designs can be marked by scanning pulse laser beams and arranging dotted irradiated traces on the marking surface. Moreover, based on the marking designs, the scanning data are produced by the computer, and then the desired marking can be reproduced automatically by the laser beam which is controlled using the produced scanning data by the computer.

BRIEF DESCRIPTION OF THE DRAWINGS

FIG. 2 is a schematic diagram of the pulse laser generating equipment used for this invention.

FIG. 4 illustrates schematically the conventional marking process using die. (A) is a cross section of a die cast and surface of a metal battery parts before marking. (B) is a magnified cross section of the mark stamped by a die. (C) is a magnified cross section of a worn or chipped die.

DETAILED DESCRIPTION OF PREFERRED EMBODIMENTS

The following paragraphs illustrate an application example of this invention to a silver button cell for watches, model No. SR626SW (6.8 mm in diameter, 2.6 mm high, and 30 mAh).

Figure 1:
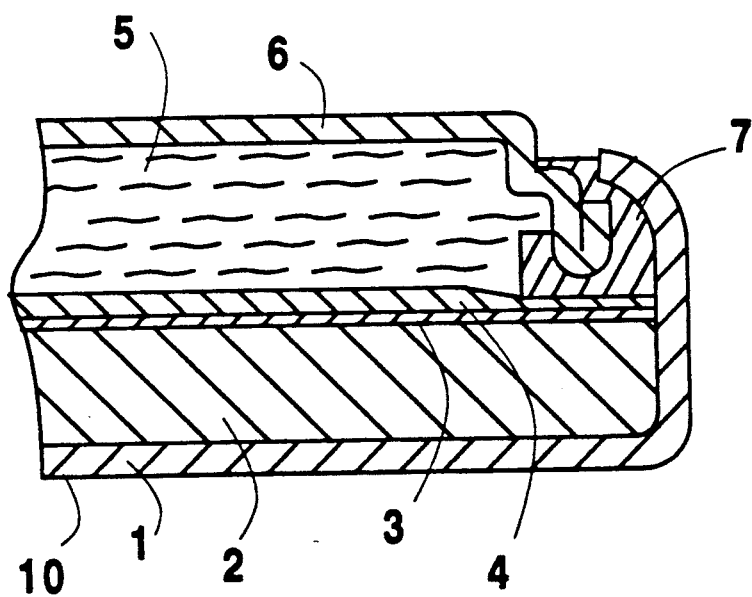
FIG. 1 is a half cross section of a silver oxide bottom cell to which this invention is applied.

FIG. 1 shows a half cross section depicting the structure of SR626SW, where 1 is a cell case serving also as a positive terminal. The cell case is made of a 0.15 mm thick pressed steel strip plated with nickel of about 5 $\mu m$ thickness. 2 is a cathode in which an active material mainly made of silver oxide powder is pressed and fixed on the inner bottom of the cell case. 3 and 4 are a separator placed on the cathode and an electrolyte absorber, respectively. The separator and electrolyte absorber separate the cathode 2 from the anode 5 to avoid an internal short circuit, and are impregnated in an alkaline electrolyte whose principal constituent is sodium hydroxide. 5 is a gelled anode consisting of amalgamated zinc powder is used as an active material the electrolyte and viscous gelling agent. 6 is a cover serving also as a negative terminal made of a pressed triple clad sheet of 0.15 mm total thickness. The sheet consists of three layers of copper, stainless steel, and nickel. 7 is an insulated gasket made of a polyamide such as "NYLON 6—6", located at the open end of the cell case 1 that is pressed and curled to seal the inside.

As illustrated in FIG. 1, pulse laser beams of the invention were irradiated to mark on the surface 1a of the outer bottom of the cell case 1 that serves also as a cathode terminal for the assembled cell.

A schematic diagram of the pulse laser generating equipment is shown in FIG. 2. In this example, Nd:YAG (neodymium ion-doped yttrium aluminum garnet) laser was used. The Nd:YAG rod 11 is excited to generate laser beams by feeding the condensed beams from the Xe lamp 12 passing through condenser 13. This laser beam is amplified by output mirror 14 and reflection mirror 15. The laser beam leaving output mirror 14 passes through beam expander 16 and is scanned on the requested locus by adjusting the "GALVANO"-type X-axis scanner mirror 17 and the Y-axis scanner mirror 18. Finally, the laser beam reaches marking surface 20 after passing through processing lens 19. In the present system, the Q switching unit 21 was installed to form a pinnacle beam shape.

Figure 3A:
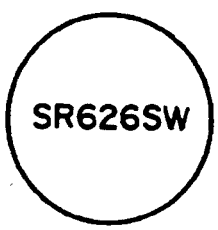
FIG. 3 shows an example of the invented marking. (A) is a magnified model number marked on the outer bottom of a cell. (B) is a more magnified image of one character of the marking. (C) is a plane view and cross section of a magnified single dot.
Figure 3B:
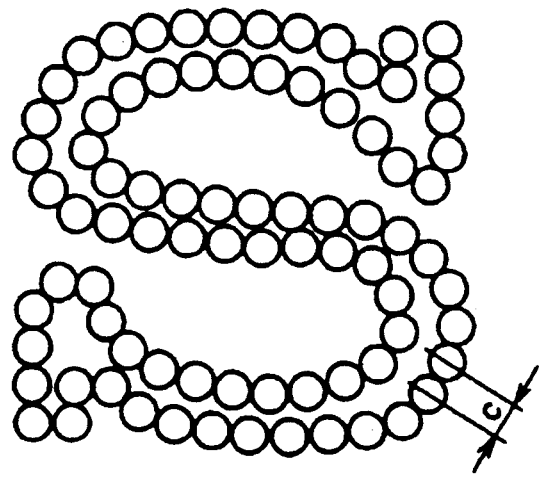
Figure 3C:
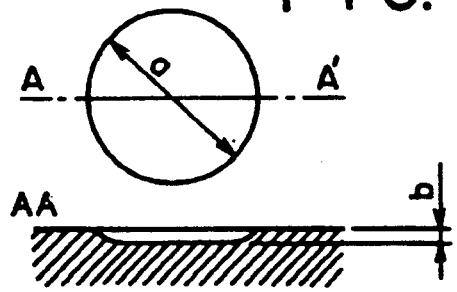
Figure 5:
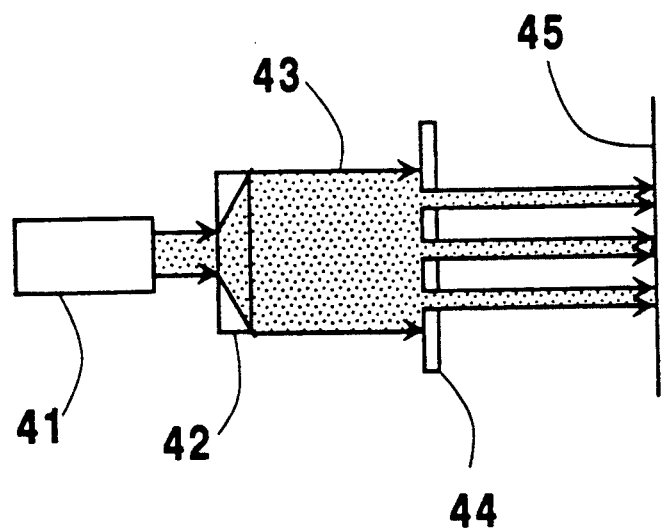
FIG. 5 shows a schematic diagram of the conventional marking process in which laser beams are irradiated on electronic components.

FIG. 3 shows an example of a cell model number marked by this invented process. Although the characters and numbers in the marked model number appear to be formed by continuous lines as shown in FIG. 3(A) when observed with the naked eye, if the magnified image of each character is observed, it is recognized as a character formed by a certain arrangement of dotted irradiated traces as shown in FIG. 3(B). If one dot with the diameter a in a single character is magnified, the dot is found to be a concave, shallow hollow with depth b as shown in the cross section A—A in FIG. 3(C).

The cell case illustrated in the present example was made of nickel plated steel with an about 5 μm nickel layer. In general, the thickness of nickel plated layer should be less than approximately 15 μm. However, if the entire nickel plated layer is destroyed and penetrated to expose bare steel during laser beam irradiation, the marked portion is likely to generate iron rust. Therefore, both the nickel plates layer thickness and the laser power should be controlled together considering the mutual effect. The degree of damage on the nickel plated layer was investigated as functions of the nickel plated layer thickness and the laser power by analysis of the existence of Fe element on the surface. The results are shown in Table 1, where "No" denotes the case that Fe element was not detected, suggesting no exposure of bare steel, while "Yes" denotes the case that Fe element was detected, indicating the exposure of bare steel. Based on the results shown in Table 1, it is suggested that a suitable intensity of between 0.1 and 5.0 W laser beam be chosen for a certain nickel plated layer thickness ranging from 3 to 15 μm which is generally used for metal battery containers. The above power of laser beam is defined as that of the irradiated pulse laser beam on the marking surface measured by a power meter.

TABLE 1

| Laser power (W) | Nickel plated layer thickness (μm) | | | | |
|---|---|---|---|---|---|
| | 3 | 5 | 7 | 10 | 15 |
| 0.1 | NO | NO | NO | NO | NO |
| 0.2 | NO | NO | NO | NO | NO |
| 0.3 | NO | NO | NO | NO | NO |
| 0.4 | NO | NO | NO | NO | NO |
| 0.5 | NO | NO | NO | NO | NO |
| 0.7 | NO | NO | NO | NO | NO |
| 1.0 | NO | NO | NO | NO | NO |
| 2.0 | YES | NO | NO | NO | NO |
| 3.0 | YES | YES | NO | NO | NO |
| 4.0 | YES | YES | YES | YES | NO |
| 5.0 | YES | YES | YES | YES | YES |

TABLE 1-continued

| Laser power (W) | Nickel plated layer thickness (μm) | | | | |
|---|---|---|---|---|---|
| | 3 | 5 | 7 | 10 | 15 |
| 6.0 | YES | YES | YES | YES | YES |

The diameter of one dot (a in FIG. 3 (C)), the depth (b in FIG. 3(C)), and the distance between the neighboring dots (c in FIG. (B)) are important factors to make the marking visually clear. We, the inventors, studied the clarity of the marking by varying the diameter, the output and the scanning speed of the laser beam, and laser oscillating frequency, etc. The results are shown in Tables 2 and 3.

TABLE 2

| Dot Diameter (μm) | Dot Depth (μm) | | | | | | | |
|---|---|---|---|---|---|---|---|---|
| | 1 | 2 | 3 | 5 | 7 | 10 | 15 | 12 |
| 30 | ○ | ● | ● | ● | ● | ● | x | x |
| 40 | ○ | ● | ● | ● | ● | ● | x | x |
| 80 | ○ | ● | ● | ● | ● | ● | ● | x |
| 120 | ○ | ○ | ● | ● | ● | ● | ● | x |
| 160 | ○ | ○ | ○ | ○ | ● | ● | ● | x |

● Very Clear
○ Clear
x Burning Occurred; inappropriate for marking

TABLE 3

| Dot Diameter (μm) | Distance between Dots (μm) | | | | | | |
|---|---|---|---|---|---|---|---|
| | 10 | 20 | 50 | 100 | 200 | 300 | 500 |
| 30 | □ | ● | ○ | x | x | x | x |
| 40 | □ | □ | ● | ○ | x | x | x |
| 80 | □ | □ | □ | ● | x | x | x |
| 120 | □ | □ | □ | ● | ○ | x | x |
| 160 | □ | □ | □ | □ | ● | ○ | x |
| 200 | x | x | x | x | x | x | x |

● Very Clear
○ Clear
□ Dots Overlap; inappropriate for marking
x Unclear; making design distorted The test results indicate that the suitable dot sizes of the marking on the surface of cell terminal made of nickel plated steel sheet, are 30-160 μm for the diameter, less than 150 μm for the depth, and 20-300 μm for the distance between the neighboring dots. We stored 100 cells which were marked under previously described which had been marked under various conditions, were stored at a temperature of 45° C. and relative humidity of 90%, and then checked the number of cells on which rusting occurred from the marking by the laser beam and through the storage period. All the diameters of marking dots of these test cells are the range of 70-100 μm. The test results are shown in Table 4. These results suggest that the most suitable depth for the dots is less than 10 μm.

TABLE 4

| Dot Depth (μm) | Store Term (month) | | | | |
|---|---|---|---|---|---|
| | 1 | 3 | 6 | 12 | 24 |
| 3 | 0 | 0 | 0 | 0 | 0 |
| 5 | 0 | 0 | 0 | 0 | 0 |
| 7 | 0 | 0 | 0 | 0 | 0 |
| 10 | 0 | 0 | 0 | 0 | 0 |
| 15 | 0 | 15 | 39 | 100 | 100 |
| 20 | 3 | 45 | 70 | 100 | 100 |

From the standpoint of productivity, the faster the scanning speed of the marking the better it is as well as the clarity of the marking. However, when the scanning speed is too fast, deformation of the inscription occurs due to inertia from the scanner mirror. In our testing, when the scanning speed for the marked surface was 400 mm/sec. or less it performed the best. In order to compensate for the shortening of the distance between the neighboring dots during the built-up stage which was caused by the inertia effect of the scanner mirror, we programmed to have the initial two pulses of the scanning of one line element of the inscription to be empty. However, the number of blank shots must be selected from one to several depending on the design and size of the object. Also, an alternative way to accomplish this task is to suppress the pulse laser beam for the amount of the blank shots. Suitable pulse frequency determined from the previously described distance between the neighboring dots and the proper value for scanning speed was 20 kHz or less; however, when stability of the laser beam output was taken into consideration it was determined that 5 kHz or less was the most suitable.

Although irradiation of the laser beam is small, local and short time, the marking area increases to a high temperature. For this reason, a nitride is formed due to the nitrogen existing in the air, and attaches onto the laser beam irradiation area, making a brown stain. In order to solve this problem, we kept the area where marking was being done in a dry argon atmosphere to prevent nitride from forming, and successfully prevented the discoloration. Also, an an alternative process, we confirmed that discoloration can be prevented by blowing air on the marking surface to blow away formed nitride.

We have described so far in detail Nd:YAG, and other types of YAG laser or carbon dioxide gas laser can be possibly utilized if proper conditions are selected.

We explained our experiment using silver oxide button cells which are one of the type of primary batteries; however, application of our invention is not limited to certain kinds of battery systems. It can also be used with rechargeable secondary batteries such as sealed NiCd batteries, as long as the container is made of metal and has a metallic glossy surface, regardless of the shape. Furthermore, marking only the permanent information using ordinary convex dies for stamps on the parts composing of battery container, and after assembly of the cell marking frequently changing information such as lot number and manufacturing date using the laser beam of our invention is a very desirable marking process from the standpoint of practical industrial value.

What we claim is:

1. A battery with a mental container containing battery system elements, wherein the container is marked by a plurality of irradiated trace dots arranged to provide a desired design, the dots having a diameter of from 30 to 160 $\mu$m, a depth of 10 $\mu$m or less, a distance between neighboring dots from 20 to 300 $\mu$m and neighboring dots do not overlap.

2. The battery described in claim 1 wherein the metal container is composed of a case, cover, and exterior metal jacket and wherein the case, cover or exterior metal jacket is made of a metal selected from at least one group consisting of nickel, tin plated steel, stainless steel, copper, copper alloy plate, and clad plates.

3. The battery described in claim 1 in which a convex stamping die was used to provide part of the marking on the metal container.

* * * * *